United States Patent
Bangolae et al.

(10) Patent No.: US 10,153,816 B2
(45) Date of Patent: Dec. 11, 2018

(54) SMALL DATA COMMUNICATIONS

(71) Applicant: INTEL IP CORPORATION, Santa Clara, CA (US)

(72) Inventors: Sangeetha Bangolae, Beaverton, OR (US); Marta Martinez Tarradell, Hillsboro, OR (US); Ana Lucia Pinheiro, Breinigsville, PA (US)

(73) Assignee: INTEL IP CORPORATION, Santa Clara, CA (US)

( * ) Notice: Subject to any disclaimer, the term of this patent is extended or adjusted under 35 U.S.C. 154(b) by 10 days.

(21) Appl. No.: 14/782,781

(22) PCT Filed: Dec. 16, 2013

(86) PCT No.: PCT/US2013/075462
§ 371 (c)(1),
(2) Date: Oct. 6, 2015

(87) PCT Pub. No.: WO2014/182338
PCT Pub. Date: Nov. 13, 2014

(65) Prior Publication Data
US 2016/0057797 A1 Feb. 25, 2016

Related U.S. Application Data

(60) Provisional application No. 61/821,635, filed on May 9, 2013.

(51) Int. Cl.
| | |
|---|---|
| *H04W 4/00* | (2018.01) |
| *H04B 7/0417* | (2017.01) |
| *H04W 52/02* | (2009.01) |
| *H04L 12/26* | (2006.01) |
| *H04L 5/00* | (2006.01) |
| *H04W 72/04* | (2009.01) |
| *H04W 72/12* | (2009.01) |
| *H04W 24/02* | (2009.01) |
| *H04W 72/10* | (2009.01) |

(Continued)

(52) U.S. Cl.
CPC ......... *H04B 7/0417* (2013.01); *H04L 5/0053* (2013.01); *H04L 27/0008* (2013.01);
(Continued)

(58) Field of Classification Search
None
See application file for complete search history.

(56) References Cited

U.S. PATENT DOCUMENTS

| | | | |
|---|---|---|---|
| 8,774,818 B2 * | 7/2014 | Lim | H04W 12/08 |
| | | | 455/450 |
| 2012/0264443 A1* | 10/2012 | Ng | H04W 4/005 |
| | | | 455/450 |

(Continued)

FOREIGN PATENT DOCUMENTS

| | | |
|---|---|---|
| EP | 2566199 A1 | 3/2013 |
| WO | WO 2014/182338 | 11/2014 |

OTHER PUBLICATIONS

3GPP TS 24.301, "Non-Access-Stratum (NAS) protocol for Evolved Packet System." As accessed on this date: Nov. 16, 2016.
(Continued)

*Primary Examiner* — Anh Vu H Ly
(74) *Attorney, Agent, or Firm* — Thorpe North & Western

(57) ABSTRACT

Technology for communicating small data between a user equipment (UE) and an evolved node B (eNB) is described. The UE may communicate with the eNB to establish a small data radio bearer (SDRB), wherein the SDRB is used for communicating the small data from the UE to the eNB. The UE may enter a power saving mode according to a power saving configuration. The UE or the eNB may maintain UE context information for the SDRB while the UE is in the power saving mode. The SDRB may be reestablished using the UE context information when the UE awakes from the power saving mode to enable the UE to communicate the small data on the SDRB to the eNB.

11 Claims, 11 Drawing Sheets

(51) Int. Cl.
 H04W 12/04 (2009.01)
 H04L 27/00 (2006.01)
 H04W 4/70 (2018.01)
 H04W 76/14 (2018.01)
 H04W 76/10 (2018.01)
 H04W 88/02 (2009.01)
 H04L 27/36 (2006.01)

(52) U.S. Cl.
 CPC ............ H04L 43/16 (2013.01); H04W 4/70 (2018.02); H04W 12/04 (2013.01); H04W 24/02 (2013.01); H04W 52/0209 (2013.01); H04W 52/0216 (2013.01); H04W 52/0229 (2013.01); H04W 52/0235 (2013.01); H04W 72/0406 (2013.01); H04W 72/0413 (2013.01); H04W 72/0453 (2013.01); H04W 72/10 (2013.01); H04W 72/12 (2013.01); H04W 76/10 (2018.02); H04W 76/14 (2018.02); H04L 5/006 (2013.01); H04L 27/362 (2013.01); H04W 88/02 (2013.01); Y02D 70/00 (2018.01); Y02D 70/122 (2018.01); Y02D 70/1262 (2018.01); Y02D 70/1264 (2018.01); Y02D 70/142 (2018.01); Y02D 70/144 (2018.01); Y02D 70/146 (2018.01); Y02D 70/21 (2018.01); Y02D 70/23 (2018.01); Y02D 70/24 (2018.01)

(56) References Cited

U.S. PATENT DOCUMENTS

2012/0281566 A1* 11/2012 Pelletier .............. H04W 76/046 370/252
2013/0003577 A1* 1/2013 Gupta ............... H04W 52/0225 370/252
2013/0308564 A1* 11/2013 Jain ........................ H04B 15/00 370/329
2014/0155074 A1* 6/2014 Xu ......................... H04W 76/00 455/450
2014/0242962 A1* 8/2014 Choi ..................... H04W 8/245 455/418
2014/0254452 A1* 9/2014 Golitschek Edler Von Elbwart ........... H04W 52/0216 370/311
2014/0321272 A1* 10/2014 Bangolae .......... H04W 36/0066 370/230
2015/0109979 A1* 4/2015 Miklos ................. H04W 76/28 370/311
2015/0223284 A1* 8/2015 Jain ................... H04W 52/0258 370/329
2015/0373733 A1* 12/2015 Bangolae ............. H04W 36/14 370/329

OTHER PUBLICATIONS

3GPP TS 24.008, "Mobile Radio Interface Layer 3 Specification." As accessed on this date: Nov. 16, 2016.
3GPP TS 36.331 "E-UTRAN Radio Resource Control Protocol Specification, Release 11." As accessed on this date: Nov. 16, 2016.
3GPP TR 23.887 Vo. 9.0. '3GPP; TSGSA: Machine-Type and other Mobile Data Applications Communications Enhancements (Release 12)', Apr. 2013.
INTEL. Corporation. 'Summary and impact analysis of SA2 proposed SDDTE solutions for MTCe', R2-131413, 3GPP TSG RAN WG2 Meeting #81bis.
Fujitsu, 'Ran impact of SA2 solutions for Small Data Transmission enhancement', R2-131049, 3GPP TSG RAN WG2 Meeting #81bis.
CATT, Considerations on AUEPCOP, R2-130996, 3GPP TGPP TSG RAN WG2 Meeting #81bis, Chicago, USA, Apr. 15-19, 2013.

* cited by examiner

```
SDRB-ToAddModList ::=        SEQUENCE (SIZE (1..maxSDRB)) OF
SDRB-ToAddMod

SDRB-ToAddMod ::=  SEQUENCE {
   sdrb-Identity             INTEGER (1..maxSDRB), rlc-Config                CHOICE {
      explicitValue             RLC-Config,
      defaultValue              NULL
   }     OPTIONAL,                                         -- Cond Setup
   logicalChannelConfig      CHOICE {
      explicitValue             LogicalChannelConfig,
      defaultValue              NULL
   }     OPTIONAL,                                         -- Cond Setup

```
DRB-ToAddMod ::=     SEQUENCE {
    eps-BearerIdentity          INTEGER (0..15)         OPTIONAL,
-- Cond DRB-Setup
    drb-Identity                DRB-Identity,
sdrb-identity                   SDRB-Identity,
    pdcp-Config                 PDCP-Config             OPTIONAL,
-- Cond PDCP
    rlc-Config                  RLC-Config              OPTIONAL,
-- Cond Setup
    logicalChannelIdentity      INTEGER (3..10)         OPTIONAL,
-- Cond DRB-Setup
    logicalChannelConfig        LogicalChannelConfig    OPTIONAL,
-- Cond Setup
    ...
}
```

FIG. 6B

SMALL DATA COMMUNICATIONS

RELATED APPLICATIONS

The present application claims priority to U.S. Provisional Patent Application No. 61/821,635, filed May 9, 2013, the entire specification of which is hereby incorporated by reference in its entirety for all purposes.

BACKGROUND

In general, machine-to-machine (M2M) communication or Machine Type Communication (MTC) may refer to technologies that allow wireless and wired systems to communicate with other devices without any human intervention. A user equipment (UE) equipped for MTC (also known as an MTC device) may include, for example, a sensor or meter to collect information. The UE can communicate via a mobile network (e.g., wireless, wired, hybrid) with an MTC application server (e.g., software program) that can use or request data from the UE.

The expansion of mobile networks (e.g., broadband wireless access networks, wide area networks) across the world, along with the increased speed/bandwidth and reduced power of wireless communication, has facilitated the growth of MTC. Although the amount of data sent by UEs equipped for MTC is very small, a large number of these devices connected to a wireless network and used concurrently may increase a data load and overhead expense on a network. Therefore, current techniques for transmitting small data payloads (e.g., machine type communication data) may be inefficient or incompatible with emerging mobile networks.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIGS. 6A and 6B illustrate abstract syntax notation (ASN) code examples of a radio resource configuration dedicated information element (IE) within a radio resource control (RRC) connection reconfiguration message or an RRC connection setup message in accordance with an example;

Figure 1:
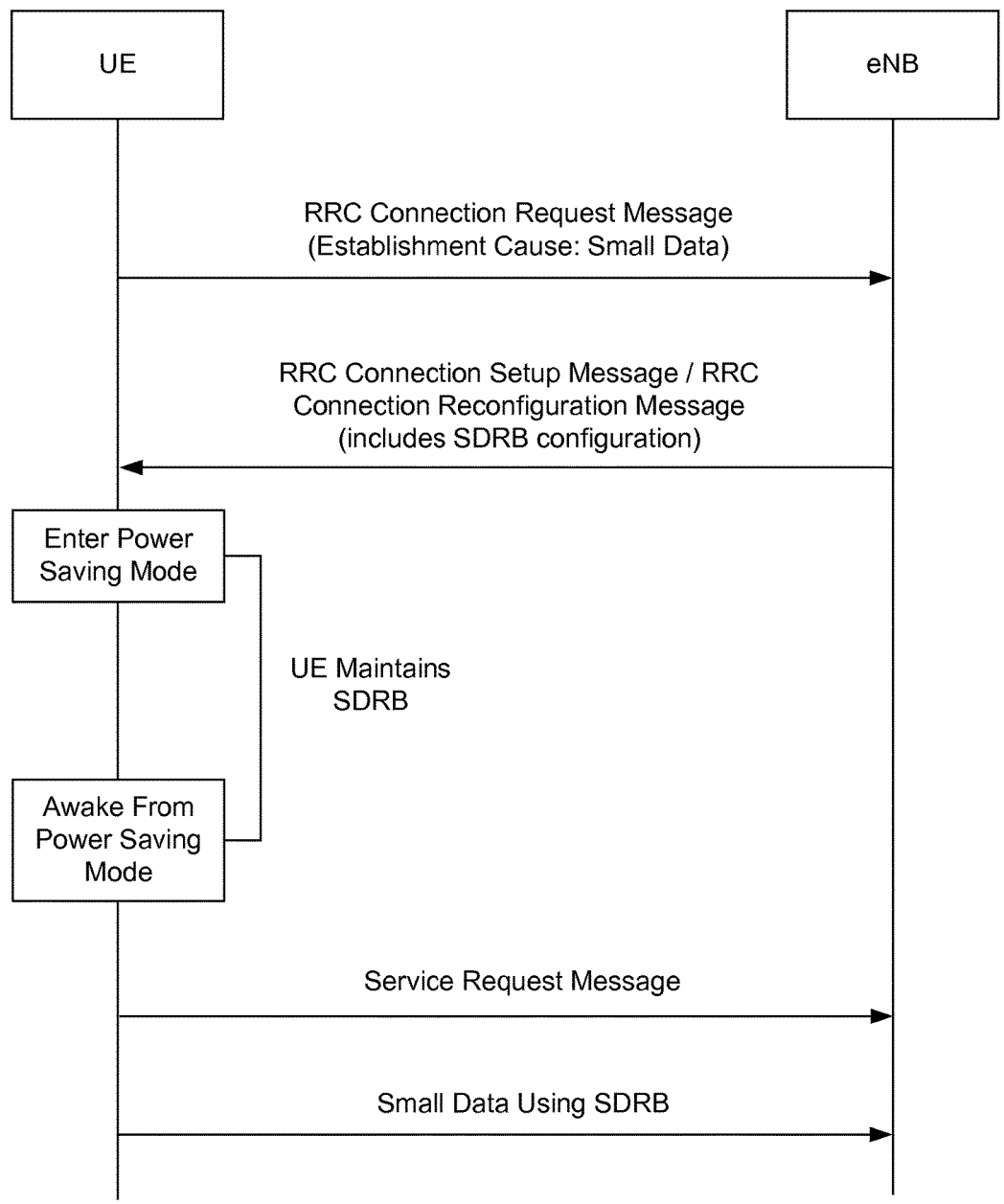
FIG. 1 is a diagram illustrating a user equipment (UE) communicating small data to an evolved node B (eNB) over a small data radio bearer (SDRB) that is maintained at the UE and/or the eNB when the UE is in a power saving mode in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

With a wide range of potential applications, Machine Type Communication (MTC) or Machine to Machine (M2M) communication has gained large interest among equipment vendors, mobile network operators, and MTC specialist companies. MTC is a form of data communication among one or more entities that does not necessarily need human interaction. Generally, a user equipment (UE) can be equipped for MTC. The UE equipped for MTC can also be known as an MTC device. The UE can communicate locally (e.g., wirelessly, through a personal area network (PAN), or hardwired) with other entities that provide the UE with data (e.g., a small data payload). Thereafter, the UE can process the data and then transmit the data to the MTC servers and/or other UEs that are equipped for MTC. The UEs can include health monitoring devices, smart meters, sensors, etc.

The UEs equipped for MTC can communicate (i.e., send or receive) small amounts of data over a network. The small amount of data typically ranges from a few bits to kilobits of data. In one example, the small data may be less than 1500 bytes. The network can be a wireless wide area network (WWAN) or wireless local area network (WLAN) based on a selected radio access network (RAN) technology. The WWAN can be configured to operate based on a cellular networking standard such as IEEE 802.16 standard, commonly referred to as WiMAX (worldwide interoperability for microwave access), and the Third Generation Partnership Project (3GPP). Releases of the IEEE 802.16 standard include the IEEE 802.16e-2005, 802.16-2009, and 802.16m-2011. Releases of the 3GPP standard include the 3GPP LTE Release 8 in the fourth quarter of 2008, 3GPP LTE Advanced Release 10 in the first quarter of 2011, and 3GPP LTE Release 11 in the third quarter of 2012.

The proliferation of small data traffic in recent years has strained the signaling architecture (e.g., the radio resource control). In general, small data communications between the UE and an evolved node B (eNB) may occur after an initial attachment procedure. The initial attachment may be a signaling handshake that occurs between the UE and the eNB in order to attach the UE to the network. During the initial attachment, a radio bearer may be established. The radio bearer (e.g., a signaling radio bearer or a data radio bearer) may define how the data is to be communicated over the network (e.g., a minimum bit rate). The radio bearer (i.e., an on-the-air radio bearer) may correspond to a core network (CN) or backend bearer. The radio bearer established during the initial attachment may be used to communicate the small data between the UE and the eNB. The amount of signaling overhead to establish the radio bearer may be practical when the UE is connected to the eNB for an extended duration (e.g., when the UE is browsing the Internet) or communicates a larger amount of data (i.e., greater than 1500 bytes). However, the amount of signaling overhead to establish the radio bearer may be unfeasible when the UE performs a small data communication with the eNB because the signaling overhead may be greater in size than the small data itself.

In one example, a small data radio bearer (SDRB) may support low-overhead small data communications over a radio access network (RAN). As discussed in greater detail below, the SDRB may be established during a radio resource control (RRC) connection establishment procedure (i.e., the initial attachment procedure). The SDRB may reduce signaling resources when sending the small data between the UE and the eNB. The SDRB may be mapped to an existing logic channel identifier (LCID) or a spare LCID. The SDRB may be mapped to different LCIDs for a downlink shared channel (DL-SCH), uplink shared channel (UL-SCH) and/or multicast channel (MCH). The LCIDs may include one or more of the LCID reserved values defined in Third Generation Partnership Project (3GPP) Technical Specification (TS) 36.321 Tables 6.2.1-1, 2 & 4).

In one example, the SDRB may be a dedicated bearer or a default bearer. Default bearers may be assigned to the UE when the UE attaches to the network and remain as long as the UE is attached to the network. The UE may have one or more default bearers, wherein each default bearer has a separate internet protocol (IP) address. Default bearers may have a non-guaranteed bit rate (GBR). Dedicated bearers may act as an additional bearer on top of the default bearer. Dedicated bearers do not require a separate IP address because the dedicated bearers are linked to at least one of the default bearers. Dedicated bearers may have a GBR or a non-GBR. The SDRB may be the dedicated bearer or the default bearer depending on whether a traffic flow template (TFT) is defined for the SDRB. The TFT may use IP header information to filter data packets (e.g., voice packets, web browsing traffic) so that the data packets can be sent down the respective bearers with an appropriate quality of service (QoS).

FIG. 1 is a diagram illustrating a user equipment (UE) communicating small data to an evolved node B (eNB) over a small data radio bearer (SDRB). The SDRB may be maintained, at the UE or the eNB, while the UE is in a low power mode (i.e., idle mode). As a result, the small data may be communicated, from the UE to the eNB, with minimal signaling after the UE wakes up from the low power mode. In other words, the small data communications may incur minimal signaling overhead when the UE transitions into the connected mode from the idle mode. In an alternative example, the UE may communicate small data to other UEs, rather than the eNB, after awaking from the low power mode.

In previous solutions, the radio bearers (e.g., the SDRB) may not be maintained when the UE transitions into the low power mode (or idle mode) from the connected mode. Thus, when the UE awakes from the low power mode and goes back into a connected state, the radio bearers may be reestablished in a radio resource control (RRC) connection establishment procedure. The UE may communicate the small data to the eNB after the radio bearer is reestablished during the RRC connection establishment procedure. In general, the UE does not retain context information for the radio bearers because the UE is assumed to be in idle mode for an extended period of time, and therefore, the resources used to retain the context information for the radio bearers when the UE is in the idle mode would be unpractical. In addition, the UE may communicate data for an extended period of time (e.g., browsing the Internet) when returning to the connected state, so reestablishing the data bearers may efficiently manage the signaling overhead for communicating the data. However, small data communications may be infrequently performed, so reestablishing the radio bearers each time the UE wakes up from idle mode may be an impractical technique for efficiently managing the signaling overhead.

As shown in FIG. 1, the UE may communicate an RRC connection request message to the eNB. The RRC connection establishment message may include an establishment cause of small data. In general, the eNB may determine an amount of resources and/or priority level that is needed for the UE based on the establishment cause received from the UE. The eNB may subsequently communicate an SDRB configuration in an RRC connection setup message. In an alternative configuration, the eNB may communicate the SDRB configuration in an RRC connection reconfiguration message rather than the RRC connection setup message. The UE may communicate small data to the eNB using the SDRB after the eNB performs the SDRB configuration.

In one example, the UE may enter a power saving mode (e.g., a low power mode or an idle mode) after the eNB performs the SDRB configuration. The UE may enter the power saving mode according to a power saving configuration, such as discontinuous reception (DRX). DRX can be used to enable the UE to discontinuously monitor a downlink control channel, such as the physical downlink control channel (PDCCH) communicated from a transmission station, such as the eNB. The discontinuous monitoring by using DRX can provide significant power savings at the UE since the receiver at the UE can be turned off for selected periods. In other words, the UE may go into a DRX sleep mode (i.e., the low power mode) when the UE does not monitor the downlink control channel.

When the UE goes into the low power mode, the UE and the eNB may release the RRC connection, but maintain UE context information for the SDRB (as shown in FIG. 1). The UE context information may include an SDRB identifier (ID) and a corresponding serving gateway (S-GW) or evolved packet system (EPS) bearer ID. The UE context information may also be known as SDRB mapping information or SDRB context information. The UE context information for the SDRB may also be known as SDRB mapping information because the SDRB ID and the corresponding EPS bearer ID may be linked to each other during the RRC connection setup procedure (i.e., the initial attachment). The UE context information may also include corresponding quality of service (QoS) characteristics, traffic flow templates (TFTs), and other SDRB bearer specific context information.

In one example, the UE and the eNB may maintain the UE context information while the UE is in the low power mode. The UE context information for the SDRB may be maintained at the UE for a predefined period of time according to a timer. Therefore, the UE may not have to reestablish the radio bearer when waking up from the low power mode because the context information for the SDRB is stored at the UE. As a result, power consumption and signaling overhead may be reduced, especially when the UE frequently transmits and/or receives small data packets. In other words, the amount of power in retaining and retrieving the UE context information may be less than the amount of power spent in sending overhead bits over the air to set up the SDRB.

In one configuration, radio-side bearers or over-the-air bearers (e.g., the SDRB) may correspond to core network (CN) bearers or backend bearers. The CN bearers can be maintained or not maintained while the UE is asleep (i.e., in the low power mode). The CN bearers (i.e., S11 tunnel from a mobility management entity (MME) to a serving gateway (S-GW) and S5/S8 from the S-GW to a packet data network gateway (P-GW)) may or may not be maintained, and therefore, the CN bearers may need to be reestablished upon a new service request from the UE. The eNB may maintain additional context information for the mapping (i.e., SDRB to S1-U to S11/S5/S8). When the CN bearers are not maintained, the CN may forward the small data received through its adequate CN bearers. When S1-U bearers (i.e., for data transmitted between the eNB and the serving gateway) and other CN bearers are maintained, the small data packet in the SDRB may be mapped to the S1-U and/or CN bearers. The mapping may be pre-configured during the initial attachment when the SDRB is established. The mapping may be pre-configured in the UE, or in both the UE and the eNB. The UE may know its SDRB ID and corresponding SGW or EPS bearer ID after the initial attachment. The SDRB ID may range from 0 to 15. In one example, the RRC connection request message communicated from the UE to the eNB may indicate which type of SDRB (e.g., dedicated non-GBR bearer) can be used to communicate the small data.

The UE may remain in the low power mode (or idle mode) for a certain period of time. The UE may subsequently wake up from the low power mode and send a service request message to the eNB (as shown in FIG. 1) upon receiving a paging message or upon receiving data from a higher layer. The service request message may be sent to the eNB to request the establishment of a non-access stratum (NAS) signaling connection with the eNB. The UE may thus invoke the service request procedure when the UE, in the idle mode, has pending user data to be sent or pending uplink signaling. As previously discussed, the UE context information for the SDRB may be maintained at the UE and/or the eNB when the UE was in the low power mode.

The UE may communicate small data to the eNB after invoking the service request procedure. Since the SDRB is maintained at the UE, the UE may communicate the small data to the eNB over the SDRB. By maintaining the SDRB at the UE when the UE is asleep, the number of steps required to reestablish the SDRB when the UE awakes from the low power mode is minimized. Thus, the RRC connection reconfiguration procedure may be avoided when the UE wakes up because the SDRB is maintained at the UE. As the UE may frequently send small amounts of data to the UE, and would presumably go into the low power mode during the time periods when small data is not being communicated to the eNB, retaining the SDRB at the UE may be advantageous in terms of power consumption and signaling overhead.

If the UE retains specific information that was previously released by the eNB and is now needed at the eNB, the UE may convey the specific information during the RRC connection establishment procedure (e.g., in an RRC connection request message). The eNB may subsequently configure the SDRB based on the information provided by the UE or through the RRC connection setup message/RRC connection reconfiguration message.

In general, the UE may communicate small data that is less than approximately 1500 bytes. Since the UE may be equipped for machine type communication (MTC), the UE may include numerous types of devices, such as smart parking meters, connected vehicular sensors, etc. Thus, the UE may include or not include a touch sensitive screen display, microphone, speaker, graphics processor, etc. The small data communicated from the UE may be related to numerous types of measurements, such as time information, speed information, temperature information, etc.

In one configuration, the eNB may suspend use of a given SDRB due to radio access network (RAN) congestion. In other words, the eNB may suspend the SDRB that was established during the initial attachment. After a predefined period of time, or when the RAN congestion has reduced, the eNB may resume use of the SDRB. In an alternative configuration, the eNB may suspend the SDRB during RAN congestion, but temporarily resume the SDRB (even if the RAN congestion has not been relieved) when the UE has small data to communicate to the eNB.

Figure 2:
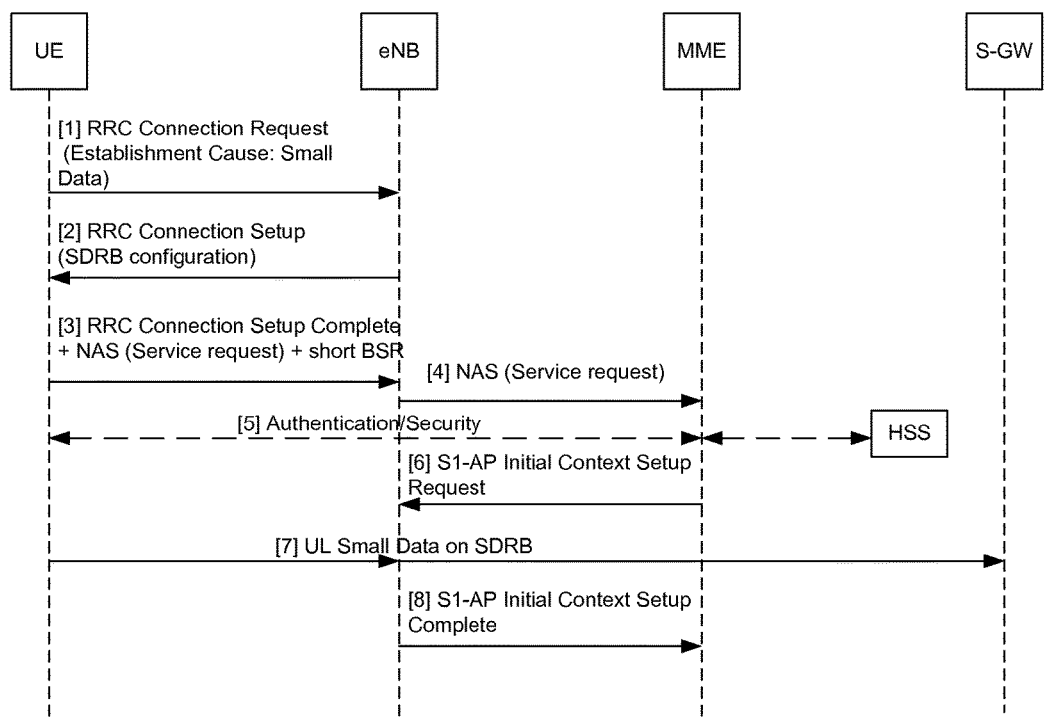
FIG. 2 is a diagram illustrating a small data radio bearer (SDRB) configuration during a radio resource control (RRC) connection establishment procedure in accordance with an example.

FIG. 2 is an exemplary diagram illustrating a small data radio bearer (SDRB) configuration during a radio resource control (RRC) connection establishment procedure. The UE may include an establishment cause of small data in an RRC connection request message communicated to the eNB (step 1). The eNB may include the SDRB configuration in an RRC connection setup message communicated to the UE (step 2). In other words, the eNB may establish or configure the SDRB in the RRC connection setup message. The UE may communicate uplink small data to the eNB over the SDRB after the eNB configures the SDRB (step 7). In one example, the UE may communicate the uplink small data over the SDRB after awaking from a low power mode or idle mode.

If the UE waits until an Evolved Universal Terrestrial Radio Access Network (E-UTRAN) sends a security mode command message to start using the SDRB (as shown in FIG. 2), integrity protection and ciphering may be activated. In LTE, ciphering and integrity are used to protect data being received from a third party, or to detect changes made by the third party. In general, integrity refers to a receiver verifying that a received message is the same message as communicated by the transmitter/sender, whereas ciphering refers to the transmitter/sender encrypting the data with a security key that is known by the receiver. If the UE sends small data using the SDRB immediately after the eNB configures the SDRB (i.e., immediately after step 2), access stratum (AS) security may not be established between the UE and the eNB. In other words, the security mode command messages may not have been exchanged between the UE and the eNB, and therefore, the small data communication may be integrity-protected, but not ciphered. Alternatively, if the UE sends the small data over the SDRB after the AC security has been established, the small data communication may be integrity-protected and ciphered.

Figure 3:
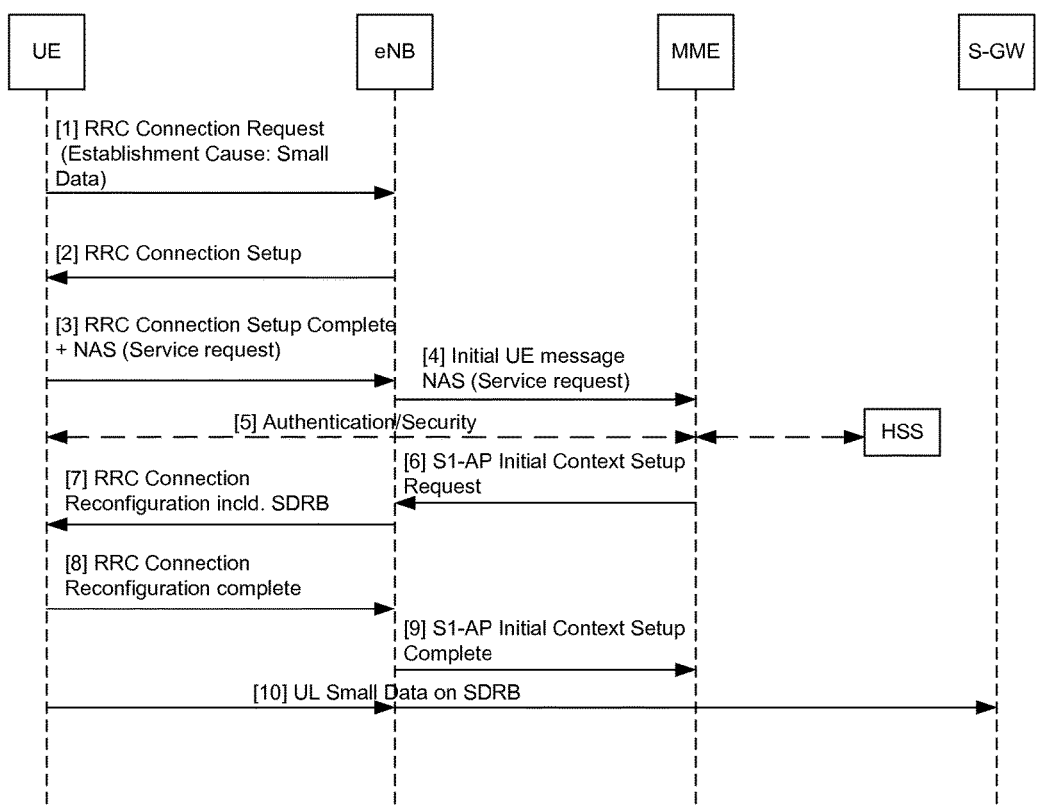
FIG. 3 is a diagram illustrating a small data radio bearer (SDRB) configuration during a radio resource control (RRC) connection reconfiguration procedure in accordance with an example.

FIG. 3 is an exemplary diagram illustrating a small data radio bearer (SDRB) configuration during a radio resource control (RRC) connection reconfiguration procedure. The UE may include an establishment cause of small data in an RRC connection request message communicated to the eNB (step 1). The eNB may respond with an RRC connection setup message communicated to the UE (step 2), but unlike in FIG. 2, the RRC connection setup message may not include the SDRB configuration. The UE may communicate an RRC connection setup complete message including a service request to the eNB (steps 3 and 4). The RRC connection setup complete message may also include a short buffer status report (BSR). In addition, the UE and the eNB (as well as other entities in the network, such as the MME) may exchange authentication and security messages (step 5).

As shown in FIG. 3, the eNB may configure the SDRB during an RRC connection reconfiguration message that is communicated to the UE (step 7). The UE may communicate an RRC connection reconfiguration complete message to the eNB (step 8). In addition, the UE may communicate uplink small data to the eNB over the SDRB after the eNB configures the SDRB (step 10). In one example, the UE may communicate the uplink small data over the SDRB after awaking from a low power mode or idle mode. In one configuration, the eNB may establish the SDRB without creating an SRB2/DRB. Alternatively, the eNB establish the SDRB along with an SRB2 and an additional data radio bearer. The eNB may establish the SDRB, SRB2 and additional DRB when other applications are running on the UE in addition to the small data application.

Figure 4:
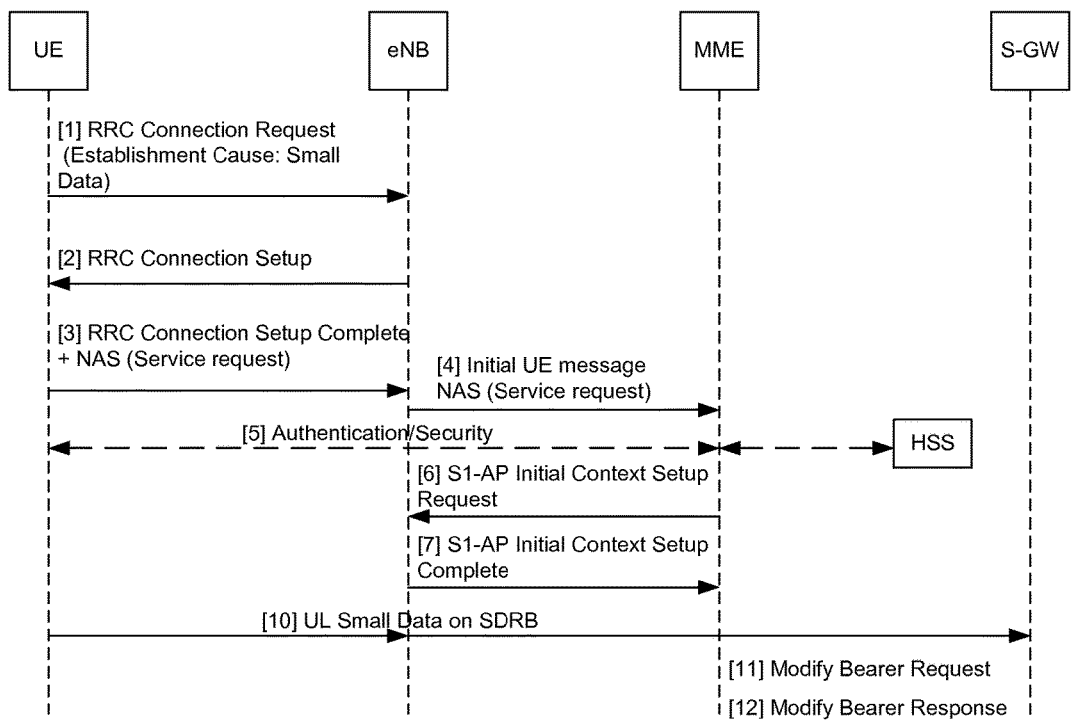
FIG. 4 is a diagram illustrating usage of a small data radio bearer (SDRB) for communicating small data to an evolved node B when UE context information for the SDRB is stored at a user equipment (UE) or the eNB during a low power mode in accordance with an example.

FIG. 4 is an exemplary diagram illustrating usage of a small data radio bearer (SDRB) for communicating small data to an evolved node B when context information for the SDRB is stored at a user equipment (UE) or the eNB during a low power mode. The UE may include an establishment cause of small data in an RRC connection request message communicated to the eNB (step 1). The eNB may respond with an RRC connection setup message communicated to the UE (step 2). The UE may communicate an RRC connection setup complete message including a service request to the eNB (steps 3 and 4). In addition, the UE and the eNB (as well as other entities in the network, such as the MME) may exchange authentication and security messages (step 5).

The eNB may not configure the SDRB in the RRC connection setup message (as shown in FIG. 2) because UE context information for the SDRB may already be stored at the UE. Similarly, the eNB may not configure the SDRB in an RRC connection reconfiguration message (as shown in FIG. 3) because the UE context information for the SDRB may already be stored at the UE. In other words, the UE may have previously received the SDRB configuration from the eNB in either the RRC connection setup message or the RRC connection reconfiguration message. The UE may have maintained context information for the SDRB during a low power mode. In addition, the UE may communicate uplink small data to the eNB using the SDRB that was previously established by the eNB. In one example, the UE may communicate the uplink small data over the pre-established and maintained SDRB after awaking from a low power mode or idle mode.

Figure 5:
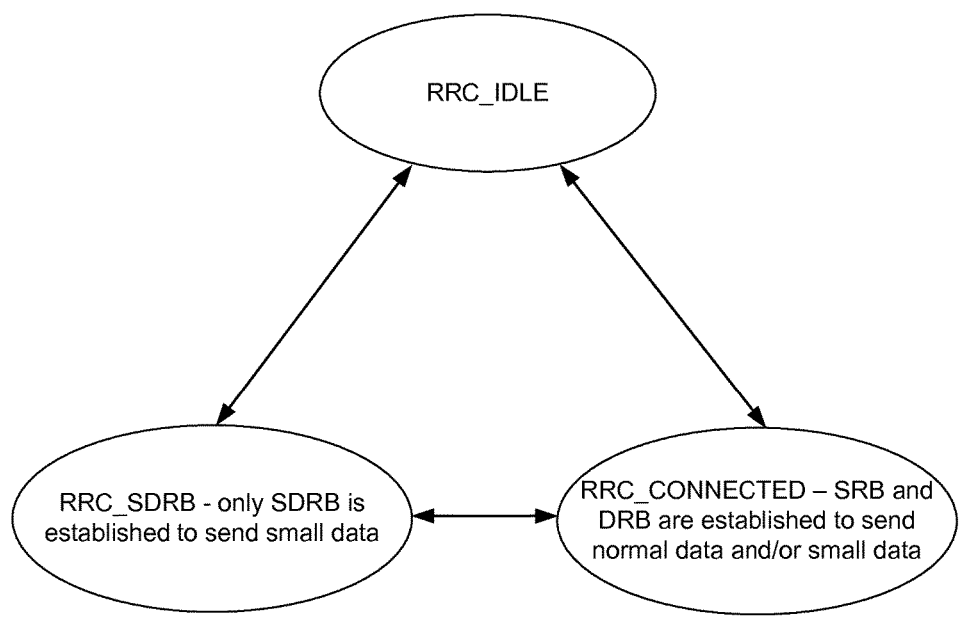
FIG. 5 is a diagram illustrating a radio resource control (RRC) idle state, an RRC small data radio bearer (SDRB) state, and an RRC connected state that can each be associated with a user equipment (UE) in accordance with an example.

FIG. 5 is a diagram illustrating a radio resource control (RRC) idle state, an RRC connected small data radio bearer (SDRB) state, and an RRC connected state that can each be associated with a user equipment (UE). The UE may transition between the RRC idle, RRC SDRB state, and/or the RRC connected state. During the RRC idle state, the UE may be in a power saving configuration and does not communicate small data with the eNB. The UE may transition to the RRC SDRB state when the UE has a small data communication pending. During the RRC SDRB state, the UE may communicate the small data to the eNB. Since SDRB related UE context information is retained at the UE when the UE transitions to the RRC SDRB state from the RRC idle state, the small data communications during the RRC SDRB state would involve reduced signaling and power consumption. In one example, the SDRB specific UE context information is retained at the UE for a predefined period of time according to a timer. The RRC SDRB state may also be known as a latent or low activity state. The UE may return to the RRC idle state from the RRC SDRB state based on an inactivity timer or based on signaling received from the network. In addition, the UE may enter the RRC connected mode, wherein a small radio bearer (SRB) and a data radio bearer (DRB) are established to send small data (i.e., data less than approximately 1500 bytes) and/or non-small data (i.e., data more than approximately 1500 bytes). In one configuration, the UE may transition between the RRC SDRB state and the RRC connected state.

FIGS. 6A and 6B illustrate abstract syntax notation (ASN) code examples of a radio resource configuration dedicated information element (IE). The radio resource configuration dedicated IE, as further described in 3GPP TS 36.331, may be within the RRC connection setup message or the RRC connection reconfiguration message received at the UE during the RRC connection setup procedure. The radio resource configuration dedicated IE may include the SDRB configuration. The radio resource configuration dedicated IE may define an SDRB identity. The SDRB identify may be represented by an integer ranging from 1 to a maximum SDRB value, wherein the maximum SDRB value is defined in 3GPP TS 36.331. The SDRB identity may be added to a list of DRBs or to a new list of radio bearers.

Figure 7:
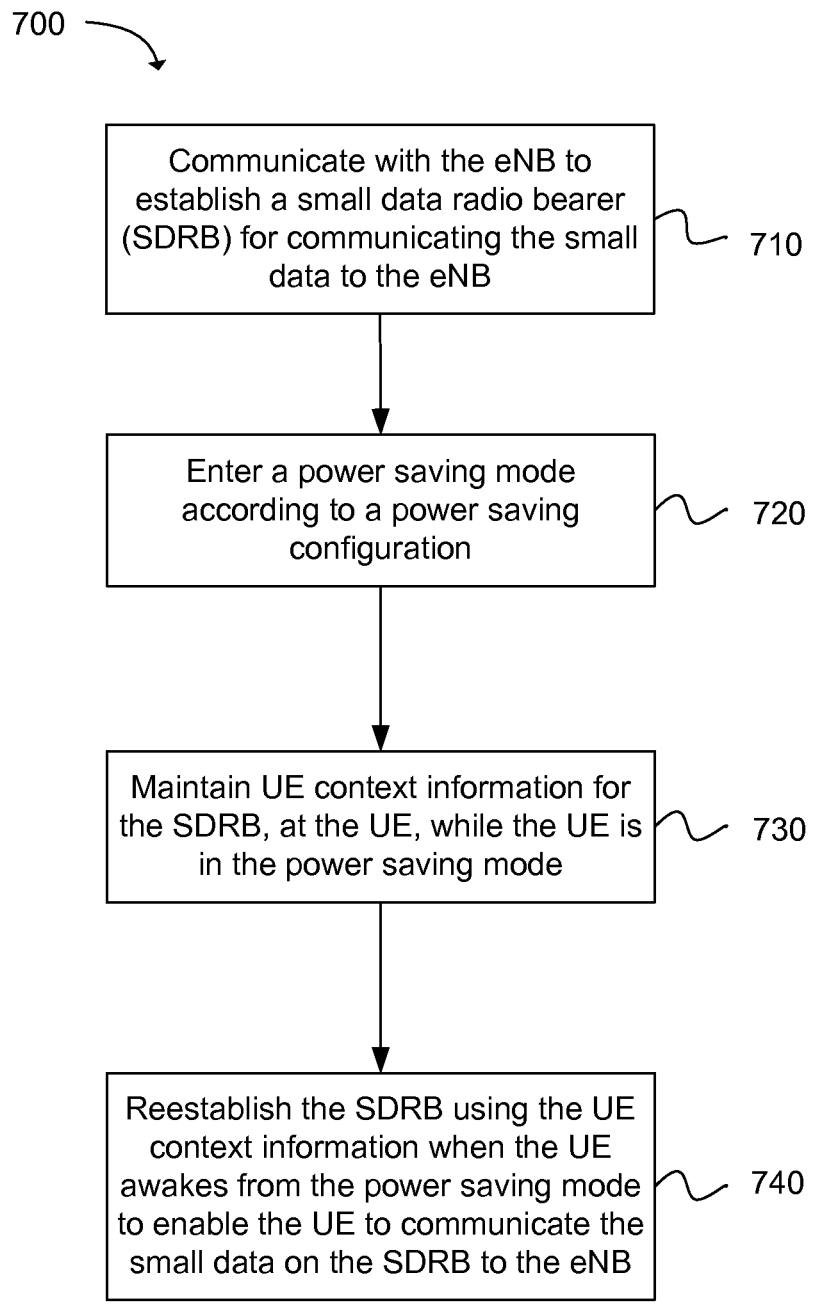
FIG. 7 depicts functionality of computer circuitry of a user equipment (UE) operable to communicate small data to an evolved node B (eNB) in accordance with an example.

Another example provides functionality 700 of computer circuitry of a user equipment (UE) operable to communicate small data to an evolved node B (eNB), as shown in the flow chart in FIG. 7. The functionality may be implemented as a method or the functionality may be executed as instructions on a machine, where the instructions are included on at least one computer readable medium or one non-transitory machine readable storage medium. The computer circuitry can be configured to communicate with the eNB to establish a small data radio bearer (SDRB) for communicating the small data to the eNB, as in block 710. The computer circuitry can be configured to enter a power saving mode according to a power saving configuration, as in block 720. The computer circuitry can be further configured to maintain UE context information for the SDRB, at the UE, while the UE is in the power saving mode, as in block 730. The computer circuitry may be configured to reestablish the SDRB using the UE context information when the UE awakes from the power saving mode to enable the UE to communicate the small data on the SDRB to the eNB, as in block 740.

In one example, the SDRB for communicating the small data to the eNB is established during an initial attachment procedure. In an additional example, the computer circuitry configured to communicate with the eNB to establish the SDRB is further configured to: send a radio resource control (RRC) connection request message to the eNB with an establishment cause of small data; receive an RRC connection setup message from the eNB for an SDRB configuration; and send an RRC connection setup complete message with a short buffer status report (BSR) to the eNB.

In one configuration, the computer circuitry can be further configured to communicate the small data to the eNB using pre-established core network (CN) bearers that are mapped to the SDRB. In addition, the computer circuitry can be further configured to communicate the small data to the eNB after sending a service request message to the eNB. In one example, the UE context information for the SDRB is maintained at the UE for a predefined period of time according to a timer. In an additional example, the UE context information includes a SDRB identifier (ID), corresponding evolved packet system (EPS) bearer IDs (S11, S5/S8 related) and QoS/TFT related characteristics.

In one configuration, the computer circuitry can be further configured to communicate the small data to the eNB when the UE is in a connected mode. In one example, the SDRB is at least one of: a dedicated non-guaranteed bit rate (non-GBR) bearer or a default bearer with a defined traffic flow template (TFT). In addition, the small data is less than 1500 bytes. In a further example, the UE is a machine type communication (MTC) device configured for communicating the small data to the eNB. Furthermore, the UE includes an antenna, a touch sensitive display screen, a speaker, a microphone, a graphics processor, an application processor, internal memory, or a non-volatile memory port.

Figure 8:
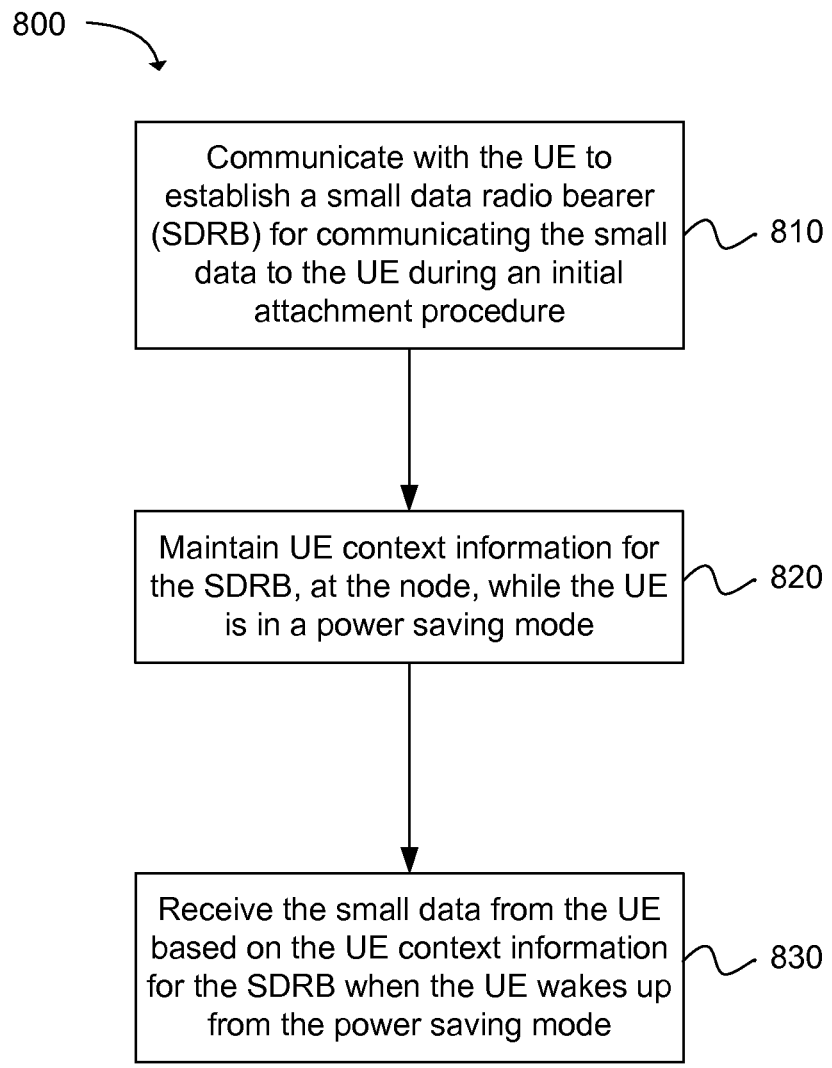
FIG. 8 depicts functionality of computer circuitry of a node operable to communicate small data to an user equipment (UE) in accordance with an example.

Another example provides functionality 800 of computer circuitry of a node operable to communicate small data with a user equipment (UE), as shown in the flow chart in FIG. 8. The functionality may be implemented as a method or the functionality may be executed as instructions on a machine, where the instructions are included on at least one computer readable medium or one non-transitory machine readable storage medium. The computer circuitry can be configured to communicate with the UE to establish a small data radio bearer (SDRB) for communicating the small data to the UE during an initial attachment procedure, as in block 810. The computer circuitry can be configured to maintain SDRB specific UE context information for the small data, at the node, while the UE is in a power saving mode, as in block 820. The computer circuitry can be further configured to receive the small data from the UE based on the UE context information for the SDRB when the UE wakes up from the power saving mode, as in block 830.

In one configuration, the computer circuitry configured to communicate with the UE to establish the SDRB is further configured to: receive a radio resource control (RRC) connection request message to the eNB with an establishment cause of small data; and send an RRC connection setup message from the eNB for an SDRB configuration. In one example, the computer circuitry can be further configured to establish the SDRB for communicating the small data to the UE in a radio resource control (RRC) connection reconfiguration message communicated to the UE. In addition, the computer circuitry can be further configured to communicate the small data to the UE using core network (CN) bearers that are mapped to the SDRB.

In one example, the SDRB related UE context information is maintained at the node for a predefined period of time according to a timer. In an additional example, the SDRB is at least one of: a dedicated non-guaranteed bit rate (non-GBR) bearer or a default bearer with a defined traffic flow template (TFT). In one configuration, the computer circuitry can be further configured to suspend the SDRB when the node is not communicating the small data to the UE. In addition, the node is selected from a group consisting of a base station (BS), a Node B (NB), an evolved Node B (eNB), a baseband unit (BBU), a remote radio head (RRH), a remote radio equipment (RRE), or a remote radio unit (RRU).

Figure 9:
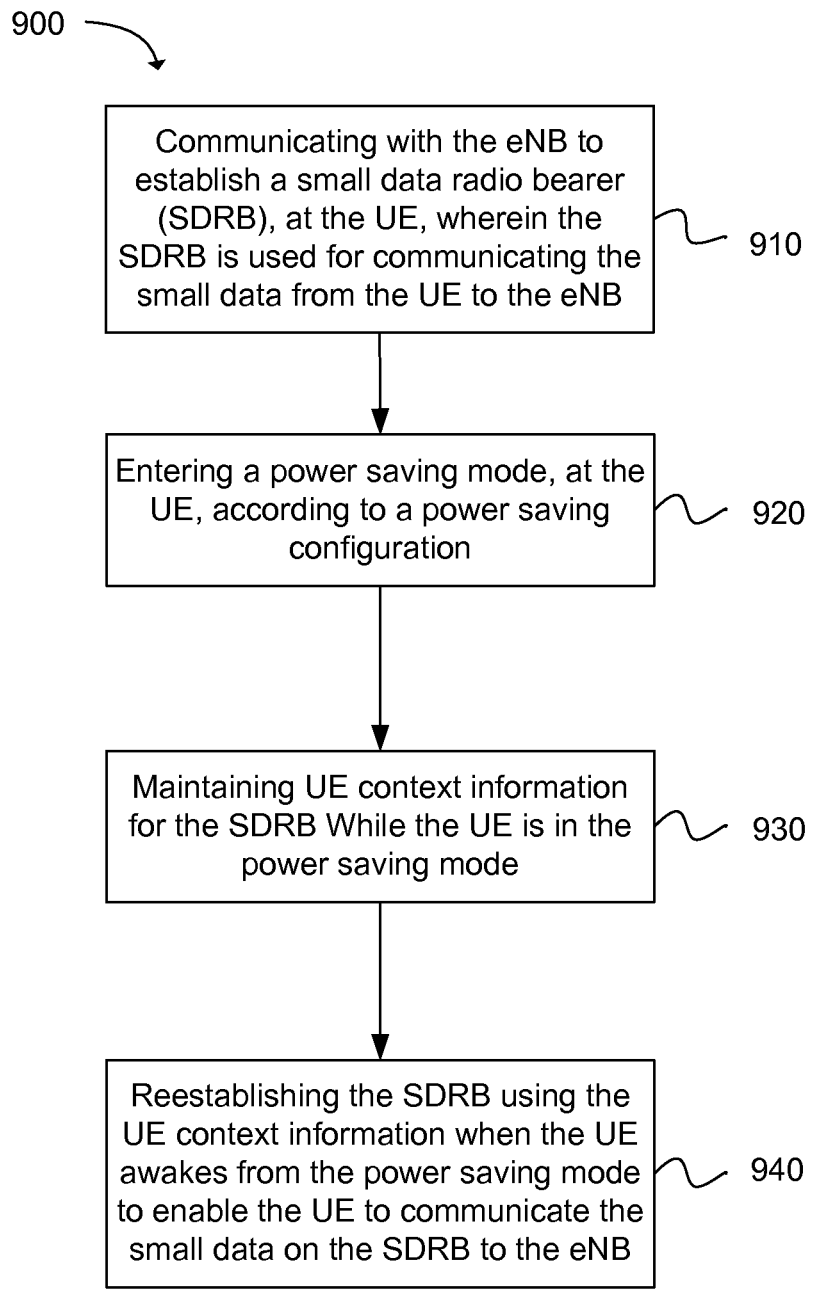
FIG. 9 depicts a flow chart of a method for communicating small data between a user equipment (UE) and an evolved node B (eNB) in accordance with an example.
Figure 10:
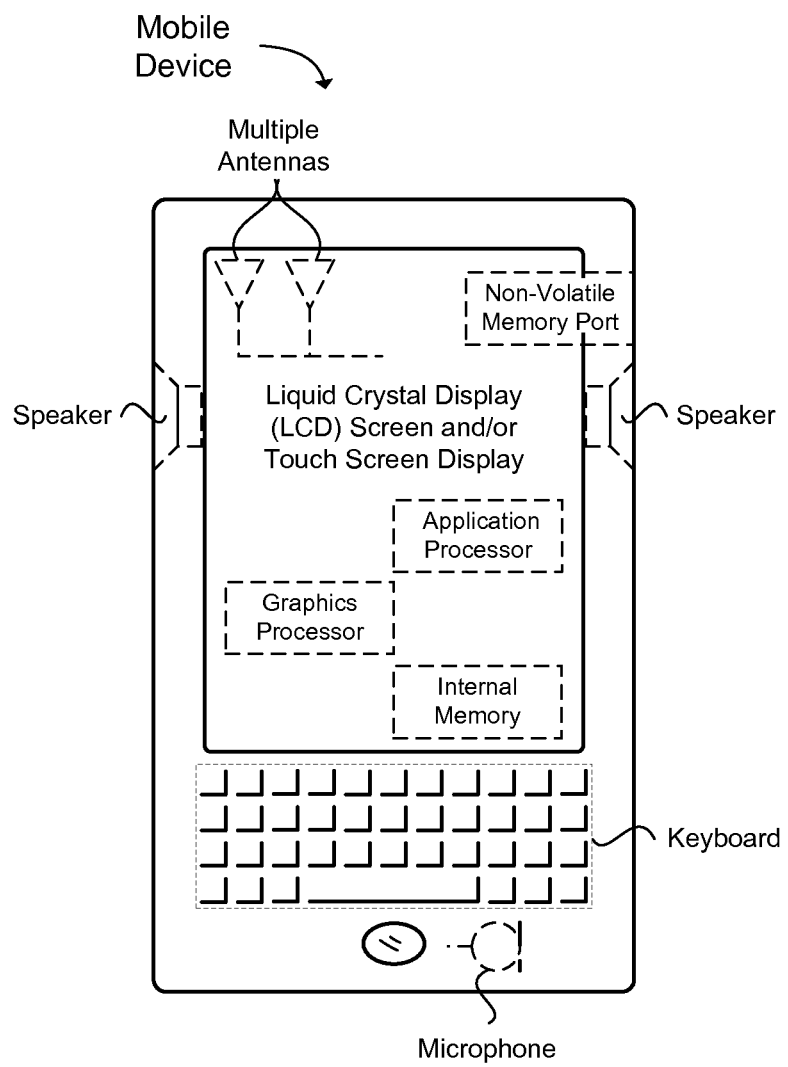
FIG. 10 illustrates a block diagram of a mobile device (e.g., a user equipment) in accordance with an example.

Another example provides a method 900 for communicating small data between a user equipment (UE) and an evolved node B (eNB), as shown in the flow chart in FIG. 9. The method may be executed as instructions on a machine, where the instructions are included on at least one computer readable medium or one non-transitory machine readable storage medium. The method includes the operation of communicating with the eNB to establish a small data radio bearer (SDRB), at the UE, wherein the SDRB is used for communicating the small data from the UE to the eNB, as in block 910. The method can include the operation of entering a power saving mode, at the UE, according to a power saving configuration, as in block 920. The method can further include the operation of maintaining UE context information for the SDRB while the UE is in the power saving mode, as in block 930. In addition, the method can include the operation of reestablishing the SDRB using the UE context information when the UE awakes from the power saving mode to enable the UE to communicate the small data on the SDRB to the eNB, as in block 940.

In one example, the method further includes maintaining the SDRB as UE context information in at least one of: the UE or the eNB. In addition, the method further includes receiving a radio resource control (RRC) connection setup message for the SDRB configuration to enable the UE to communicate the small data to the eNB. In one example, the UE context information includes a SDRB identifier (ID) or an evolved packet system (EPS) bearer ID.

FIG. 7 provides an example illustration of the mobile device, such as a user equipment (UE), a mobile station (MS), a mobile wireless device, a mobile communication device, a tablet, a handset, or other type of mobile wireless device. The mobile device can include one or more antennas configured to communicate with a node, macro node, low power node (LPN), or, transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 7 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed:
1. An evolved node B (eNB) operable to communicate small data with an user equipment (UE), the eNB having computer circuitry configured to:

communicate with the UE to establish a small data radio bearer (SDRB) for communicating the small data to the UE during an initial attachment procedure comprising:
- receive a radio resource control (RRC) connection request message from the UE with an establishment cause of small data to enable the eNB to prepare a network setup for the SDRB;
- send an RRC connection setup message from the eNB to the UE for an SDRB configuration to enable the UE to enter an RRC SDRB state;
- communicate the small data from the eNB to the UE using core network (CN) bearers that are mapped to the SDRB while the UE is in the RRC SDRB state; and
- transition from the RRC SDRB state to an RRC connected state.

2. The node of claim 1, further configured to establish the SDRB for communicating the small data to the UE in a radio resource control (RRC) connection reconfiguration message communicated to the UE.

3. The node of claim 1, further configured to communicate the small data to the UE using corresponding S1-U/related core network (CN) bearers that are mapped to the SDRB.

4. The node of claim 1, wherein the UE context information is maintained at the node for a predefined period of time according to a timer.

5. The node of claim 1, further configured to suspend the SDRB when the node is not communicating the small data to the UE.

6. The node of claim 1, wherein the node is selected from a group consisting of a base station (BS), a Node B (NB), an evolved Node B (eNB), a baseband unit (BBU), a remote radio head (RRH), a remote radio equipment (RRE), or a remote radio unit (RRU).

7. The node of claim 1, further configured to:
- maintain UE context information for the SDRB, at the node, while the UE is in a power saving mode; and
- receive the small data from the UE based on the UE context information for the SDRB when the UE wakes up from the power saving mode.

8. The node of claim 1, wherein the computer circuitry is further configured to transition from the RRC SDRB state to an RRC idle state.

9. The node of claim 8, wherein the computer circuitry is further configured to transition from the RRC SDRB state to an RRC idle state upon expiration of an inactivity timer.

10. The node of claim 8, wherein the computer circuitry is further configured to transition from the RRC SDRB state to an RRC idle state based on signaling received from a network.

11. The node of claim 1, wherein the computer circuitry is further configured to transition from the RRC SDRB state to an RRC idle state and then to an RRC connected state to enable control information and data to be communicated between the UE and the eNB.

* * * * *